US010737278B2

(12) United States Patent
Saari et al.

(10) Patent No.: US 10,737,278 B2
(45) **Date of Patent: *Aug. 11, 2020**

(54) DEVICE AND METHOD FOR SEPARATING MATERIALS

(71) Applicant: Genano Oy, Espoo (FI)

(72) Inventors: Sampo Saari, Lempäälä (FI); Panu Karjalainen, Ruutana (FI); Topi Rönkkö, Lempäälä (FI); Pasi Makkonen, Vantaa (FI)

(73) Assignee: Genano Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 16/599,130

(22) Filed: Oct. 11, 2019

(65) Prior Publication Data

US 2020/0038880 A1 Feb. 6, 2020

Related U.S. Application Data

(63) Continuation of application No. 15/611,811, filed on Jun. 2, 2017.

(51) Int. Cl.

*B01D 53/02* (2006.01)
*B03C 3/49* (2006.01)
*B03C 3/41* (2006.01)

(52) U.S. Cl.

CPC .................. *B03C 3/49* (2013.01); *B03C 3/41* (2013.01); *B03C 2201/08* (2013.01); *B03C 2201/10* (2013.01)

(58) Field of Classification Search

CPC .. A61K 31/546; A61K 2300/00; A61K 38/00; A61K 38/50; A61K 45/06;

(Continued)

(56) References Cited

U.S. PATENT DOCUMENTS 6,228,148 B1 * 5/2001 Aaltonen .................. B03C 3/15 55/431
6,632,267 B1 * 10/2003 Ilmasti ...................... B03C 3/16 95/59

(Continued)

FOREIGN PATENT DOCUMENTS

DE 1471620 A1 5/1969
DE 19751984 A1 5/1999

(Continued)

*Primary Examiner* — Christopher P Jones
(74) *Attorney, Agent, or Firm* — Laine IP Oy

(57) ABSTRACT

According to an example aspect of the present invention, there is provided a device for separating materials in the form of particles and/or drops from a gas flow, especially particles and/or drops the diameter of which varies from one nanometer to a few dozen nanometers, the device comprising an inlet for incoming air to be purified, a collection chamber, an outlet for the purified air, a voltage source with actuators, an fastening column to which ion yield tips have been coupled, the device is configured to direct high tension to the ion yield tips providing ion beams from the ion yield tips to the collection surface, the collection surface conducting electricity is electrically insulated from the outer wall of the collection chamber by an electrical insulation, and the device is configured to direct voltage of opposite sign to the ion yield tips than the voltage directed to the collection surface, wherein ion yield tips are arranged directly on a surface of the fastening column having a length, wherein the ion yield tips protrude from the surface of the fastening column into a cavity of the collection chamber.

20 Claims, 2 Drawing Sheets

(58) Field of Classification Search
CPC .............. A61K 9/0053; B03C 2201/08; B03C 2201/10; C03C 3/41; C03C 3/49; C12N 9/86; C12Y 305/02006
See application file for complete search history.

(56) References Cited

U.S. PATENT DOCUMENTS

| | | | | |
|---|---|---|---|---|
| 6,656,248 | B2 * | 12/2003 | Ilmasti | B03C 3/155 55/429 |
| 7,316,735 | B2 * | 1/2008 | Tomimatsu | B03C 3/41 55/DIG. 38 |
| 7,976,616 | B2 * | 7/2011 | Alam | B03C 3/41 313/351 |
| 2003/0061934 | A1 * | 4/2003 | Ilmasti | B03C 3/155 95/57 |

FOREIGN PATENT DOCUMENTS

| | | | |
|---|---|---|---|
| EP | 1165241 | B1 | 10/2009 |
| JP | S5756056 | A | 4/1982 |

* cited by examiner

DEVICE AND METHOD FOR SEPARATING MATERIALS

FIELD

The present invention relates to a device for separating materials in the form of particles and/or drops from a gas flow. Further, the present invention relates to a method for separating materials in the form of particles and/or drops from a gas flow.

BACKGROUND

At present, filters, cyclones, or electrical methods, such as electric filters or an ion blow method, are used in gas purification systems and for separating particles from a gas flow. Methods and devices for separating particles or drops from a gas flow are e.g. known from DE 1471620 A1 and DE 19751984 A1.

Air purifiers that are currently being used have moved away from the conventional method of using filters in order to mechanically extract unwanted particles from air. Such conventional filtration systems suffer from the disadvantages that the air flow has to be limited to a slow flow stream and that the filter has to be periodically removed for cleaning. In addition, it is not possible to achieve good cleaning results with the known techniques, when the particles have a diameter in the range between a nanometer and a few dozen nanometers.

The operation of the cyclones is based on the decrease in the gas flow speed so that the heavy particles in the gas flow fall down into the collection organ. Cyclones are thus applicable for separating heavy particles.

In electric filters, the separation of particles from gas is carried out onto collection plates or to interior surfaces of pipes. The speed of the flowing gas in electric filters has to be generally under 1.0 m/second, manufacturer's recommendations being about 0.3-0.5 m/second. The reason for a small gas flow speed is that a higher flow speed releases particles accumulated onto plates, thus decreasing reduction efficiency considerably. The operation of electric filters is based on the electrostatic charge of particles. However, it is challenging to electrically charge particles in the nanometric category. In addition, all materials are not charged electrically. Low gas flow speed has to be used also because of the cleaning stage of the collection plates. When cleaning the plates, a blow is directed to the plates, releasing the collected particle material. The intention is that only the smallest possible amount of particle material released from the plates during the purification stage would get back to the flowing gas. With a small gas flow speed it is possible to achieve tolerable particle passing throughs.

Further, electric air purifiers exploit the properties of charges in ionised gas and use electrostatic means to extract the charged particles from a directed airflow. This method of extraction improves efficiency not only in terms of overall amount of particles being extracted but also the types of particles. An air purifier would typically exploit the properties of positively or negatively charged particles where an electric field would interact with these charged particles. The charged particles would respond to the electric field and be pulled towards the ion blow onto a collection surface.

Document EP 1165241 B1, for example, discloses a method and device for separating materials in the form of particles and/or drops from a gas flow, in which method the gas flow is directed through a collection chamber the outer walls of which are grounded, and in which high tension is directed to the ion yield tips arranged in the collection chamber, thus providing an ion flow from the ion yield tips towards the collection surface, separating the desired materials from the gas flow. It is characteristic of the invention that the collection surface conducting electricity are electrically insulated from the outer casings, and that high tension with the opposite sign of direct voltage as the high tension directed to the ion yield tips is directed to the collection surface. According to an embodiment of the invention the electrical insulation is made of ABS, and the surface conducting electricity comprises a thin chrome layer arranged on the insulation layer. The ion yield tips are arranged in rings, with the help of which the distance between the ion yield tips and the collection surface is made shorter. Thus, some particles contained in the slow gas flow do not pass through the ion beams, but instead between the fastening rod and the ion yield tips.

In view of the foregoing, it would be beneficial to provide a method and a system further improving reduction efficiency. The system should be capable of being manufactured in industrial scale.

SUMMARY OF THE INVENTION

The invention is defined by the features of the independent claims. Some specific embodiments are defined in the dependent claims.

According to a first aspect of the present invention, there is provided a device for separating materials in the form of particles and/or drops from a gas flow, the device comprising an inlet for incoming air to be purified, a collection chamber, an outlet for the purified air, a voltage source with actuators, an fastening column to which ion yield tips have been coupled, the device is configured to direct high tension to the ion yield tips providing ion beams from the ion yield tips to the collection surface, the collection surface conducting electricity is electrically insulated from the outer wall of the collection chamber by an electrical insulation, and the device is configured to direct voltage of opposite sign to the ion yield tips than the voltage directed to the collection surface, wherein the ion yield tips are arranged directly on a surface of the fastening column having a length, wherein the ion yield tips protrude from the surface of the fastening column into a cavity of the collection chamber.

Various embodiments of the first aspect may comprise at least one feature from the following bulleted list:

- the collection chamber is formed cylindrically, elliptically or annularly
- the fastening column is formed cylindrically, elliptically or annularly
- a diameter of a cylindrical fastening column is in a range between 40-150 mm, preferably between 80-120 mm, for example 100 mm
- a major axis of an elliptical fastening column is in a range between 40-150 mm, preferably between 80-120 mm, for example 100 mm, and/or a minor axis of the elliptical fastening column is in a range between 20-120 mm, preferably between 50-100 mm, for example 80 mm
- a maximum diameter or a maximum major axis of the collection chamber is in a range between 200-1600 mm
- a voltage is in a range between 10-100 kV, preferably in a range between 10-60 kV
- a current is in a range between 50-5000 μA, preferably between 400-2300 μA, for example 1500 μA
- the length of an ion yield tip is in a range between 1-40 mm, preferably between 5-20 mm

- the ion yield tips are arranged spirally wound around the surface of the fastening column
- a volumetric flow rate of the air is in a range of 20-800 $m^3/h$, for example 200 $m^3/h$
- a velocity of an air flow through the cavity is in a range between 0.5-2.5 m/s, for example more than 1.0 m/s
- a plurality of ion yield tips of a set of ion yield tips is arranged at an even distance to each other
- at least a portion of the ion yield tips is orientated at an angle in the range between 40°-50°, preferably of 45°, to the surface of the fastening column in a direction downstream, at an angle in the range between 40°-50°, preferably of 45°, to the surface of the fastening column in a direction upstream, or at an angle in the range between 80°-100°, preferably perpendicular, to the surface of the fastening column
- the fastening column comprises outer surfaces forming a closed body
- the device is configured to guide an air flow through the cavity between the fastening column and the collection surface
- at least a part of an outer wall of the collection chamber or at least a part of a band made of electrically conductive material, which band surrounds the outer wall of the collection chamber, is grounded According to a second aspect of the present invention, there is provided a method of separating materials in the form of particles and/or drops from a gas flow, the method comprising directing the gas flow through a collection chamber, providing a cavity for the gas flow between a fastening column and a collection surface conducting electricity that is electrically insulated from the outer wall of the collection chamber, providing ion yield tips on a surface of the fastening column, creating high tension between the ion yield tips and the collection surface providing ion yield tips on a surface of the fastening column having a length and a diameter, which ion yield tips protrude from the surface of the fastening column into the cavity of the collection chamber, directing high tension with the opposite sign of direct voltage than the high tension directed to the ion yield tips to the collection surface, separating inside the collection chamber at least a part of the materials from the gas flow.

Various embodiments of the second aspect may comprise at least one feature from the following bulleted list:

- the gas flow is guided through the cavity between the surface of the fastening column and the collection surface
- the gas flow is guided along the surface of the fastening column
- the gas flow is exposed to an electric field in the cavity between the ion yield tips and the collection surface, and wherein all of the material contained in the gas flows through the cavity
- a voltage of 10-100 kV, preferably a voltage in a range between 10-60 kV, is used in the method
- a diameter of the fastening column in a range between 40-150 mm is used in the method
- a current in a range between 50-5000 μA, preferably 400-2300 μA, for example 1500 μA is used in the method
- the gas flow is guided through the cavity with a volumetric flow rate of the air is in a range of 20-800 $m^3/h$, for example 200 $m^3/h$
- the gas flow is guided through the cavity with a velocity in a range between 0.5-2.5 m/s, for example more than 1.0 m/s Considerable advantages are obtained by certain embodiments of the invention. A system and a method of separating materials in the form of particles and/or drops from a gas flow are provided. By means of certain embodiments of the present invention separation of materials from a gas flow can be further improved. In particular, a high reduction efficiency can be achieved.

Surprisingly, increasing the diameter of the fastening column, thus also increasing the local flow speed in the cavity, does not reduce the reduction efficiency in comparison to the known systems. Surprisingly, it seems that the effect of the increased electric field and current in the cavity between the fastening column and the collection surface is more important than the effect of a higher speed of the gas flow. For example, a device according to certain embodiments of the invention using a fastening column with a diameter of 100 mm, using a voltage of 60 kV and using a current of 1400 μA has provided an excellent reduction efficiency, for example for particles having a size of greater than 50-200 nm. The reduction efficiency can be improved from about 70% to about 80% by means of certain embodiments of the invention. A suitable amount of ion yield tips can be arranged directly on the surface of the fastening column. The gas flow is exposed to an electric field in the cavity between the ion yield tips and the collection surface and all of the material contained in the gas flows through the cavity. There is no gas flow through rings outside the electric field. According to certain embodiments, the reduction efficiency can be also improved for particles and/or drops the diameter of which varies from one nanometer to 10 nanometers or to 20 nanometers or to a few dozen nanometers. In particular, the system according to certain embodiments of the invention also improves the reduction efficiency of particles and/or drops with a diameter of less than 10 nanometers.

EMBODIMENTS

The present invention relates to a device for separating materials in the form of particles and/or drops from a gas flow, the device comprising a chamber arranged within a housing providing an inlet and an outlet for an air flow. The housing provides a surface which serves as a collection surface. Inside the housing substantially at the centre is provided a column with a cylindrical or elliptical body. On the surface of the cylindrical or elliptical body a series of ion yield tips is arranged for directing ion beams to the collection surface. The column is connected to a power supply that allows the ion yield tips to generate electric fields in the form of ion beams emanating from the ion yield tips. The housing and the column are isolated from each other and they can be connected to separate power supplies so that they possess different charges for the purpose of directing the electric fields. The column is typically at least partially a cylindrical body that has a surface defined by the diameter in its cross section and the length of the body. The dimensions of the column define the cross sectional area of a cavity between the column and the collection surface. The local velocity of the air flow in the cavity can be increased by increasing the diameter of the column. Further, the larger the surface area, the more ion yield tips can be arranged on the body, thereby increasing the electric field and current generated encapsulating the body. This allows greater exposure of the electric field for the particles contained in the air flow to be charged and then directed to the collection surface for removal. The high density of the electric field created inside the chamber improves the efficiency of extraction of the particles by extracting more particles from a fast flow of air. Furthermore, all particles included in the air flow have to pass through the cavity between the column and the collection surface.

Figure 1:
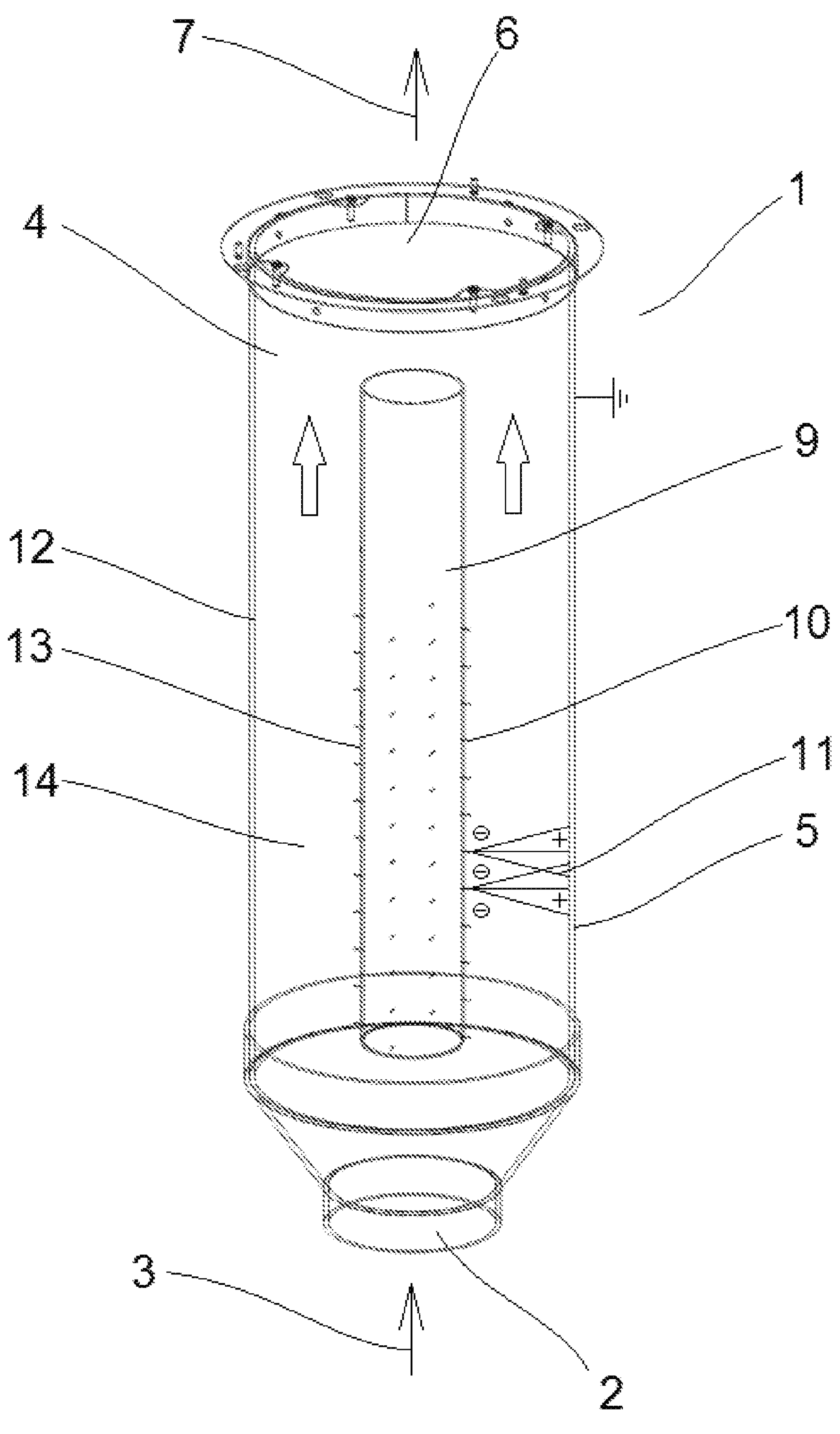
FIG. 1 illustrates a schematic view of a device for separating materials in accordance with at least some embodiments of the present invention.

In FIG. 1 a schematic view of a device for separating materials in accordance with at least some embodiments of the present invention is illustrated. The device 1 is designed to separate materials in the form of particles and/or drops from a gas flow. Especially, the device is designed to separate particles and/or drops the diameter of which varies from one nanometer to a few dozen nanometers. The device comprises an inlet 2 for incoming air 3 to be purified, a collection chamber 4, an outlet 6 for the purified air 7, a voltage source with actuators, and a fastening column 9 to which ion yield tips 10 have been coupled. A metal band (not shown), which surrounds the outer wall of the collection chamber, is grounded. The fastening column 9 comprises outer surfaces forming a closed body. The device 1 is configured to guide an air flow through a cavity 14 between the fastening column 9 and a collection surface 12. The device 1 is further configured to direct high tension to the ion yield tips 10 providing ion beams 11 from the ion yield tips 10 to the collection surface 12.

The collection surface 12 conducting electricity is electrically insulated from the outer wall 5 of the collection chamber 4 by an electrical insulation. The electrical insulation may be, for example, attached to the outer wall 5 of the collection chamber 4 with the help of fasteners (not shown). The electrical insulation may be glass, plastic, acrylic-nitrile-butadiene-styrene (ABS), or some other similar substance insulating high tension, for instance.

Furthermore, the device 1 is configured to direct voltage of opposite sign to the ion yield tips 10 than the voltage directed to the collection surface 12. In other words, voltage with the opposite sign of direct voltage (positive in the figure) as the high tension directed to the ion yield tips 10 (negative in the figure) is directed to the surface 12 conducting electricity. Thus, the voltages are opposite, i.e. positive for the ion yield tips 10 and negative for the surface 12 conducting electricity, or negative for the ion producing tips 10 and positive for the surface 12 conducting electricity. Typically, the voltage of the ion yield tips 10 is substantially equal to that of the collection surface 12, but it is also possible to use voltages of different magnitude. The advantage of equal voltages is the simple structure of high tension centres. Better purification results have also been achieved with equal voltages.

The ion yield tips 10 are arranged directly on a surface 13 of the fastening column 9 having a length $L_{col}$ and a diameter $D_{col}$, wherein the ion yield tips 10 protrude from the surface 13 of the fastening column into a cavity 14 of the collection chamber 4. The dimensions of the fastening column 9 define the cross sectional area of the cavity 14 between the column and the collection surface. Thus, for a given volumetric flow rate of the air application of the equation of continuity results in an increasing local velocity of the air flow through the cavity 14 with increasing diameter of the fastening column.

Figure 2:
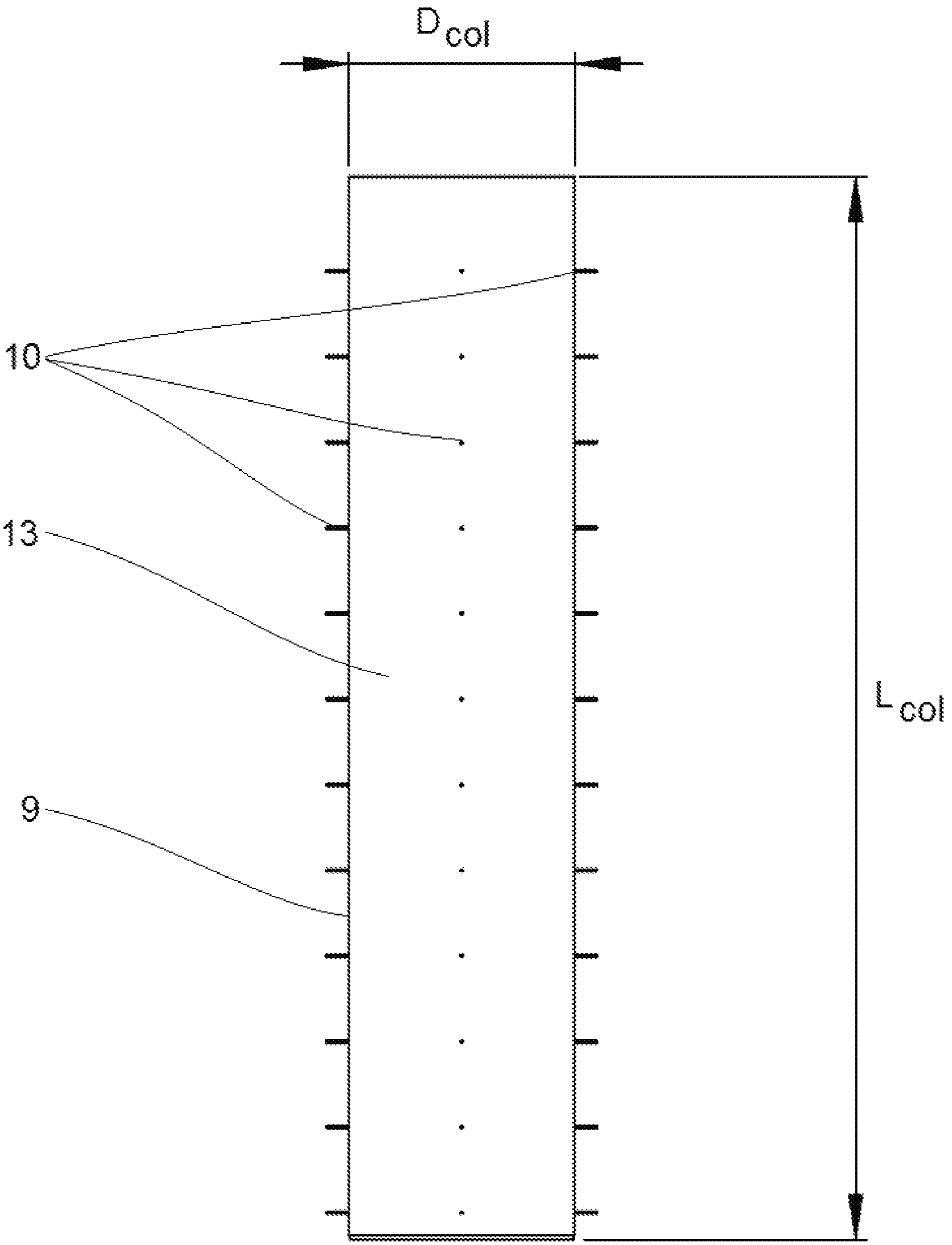
FIG. 2 illustrates a schematic side view of a fastening column in accordance with at least some embodiments of the present invention.

In FIG. 2 a schematic side view of a fastening column 9 in accordance with at least some embodiments of the present invention is illustrated. The diameter $D_{col}$ of the fastening column 9 may be in a range between 40-150 mm, for instance. In particular, the diameter $D_{col}$ of the fastening column may be e.g. 40 mm, 100 mm, or 150 mm. The ratio between the diameter $D_{col}$ and the maximum diameter of the collection chamber may be, for example, 1:3. The fastening column 9 may e.g. include 48 ion yield tips 10. The length of an ion yield tip 10 may be in a range between 2-15 mm, for instance. In particular, the length of an ion yield tip 10 may be e.g. 5 mm or 10 mm. In FIG. 2 the ion yield tips are arranged at an even distance relative to each other. According to certain embodiments, the ion yield tips 10 are arranged spirally wound around the surface 13 of the fastening column 9.

Air flows through the ring-like cavity 14 of the collection chamber 4 during use of the shown fastening column 9 in a device 1 according to FIG. 1. The volumetric flow rate of the air may be e.g. about 200 $m^3/h$. The velocity of an air flow through the cavity 14 may be in a range between 0.5-2.5 m/s, for example 1.5 m/s.

All particles and/or drops contained in the air flow pass through the cavity 14 between the collection surface 12 and the surface 13 of the fastening column 13. Consequently, all particles and/or drops pass through ion beams 11, thus improving the purifying process of the air.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases “in one embodiment” or “in an embodiment” in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in air purifiers and/or purifying air. Very suitable uses being particularly isolation rooms in hospitals, operating rooms, factories manufacturing microchips, and air intake in such rooms in which biological weapons have to be repelled. Of course, the present invention may also find application in purification of rooms in homes and offices.

REFERENCE SIGNS LIST

1 device for separating materials
2 inlet
3 incoming air
4 collection chamber
5 outer wall
6 outlet
7 purified air
9 fastening column
10 ion yield tips
11 ion beams
12 collection surface
13 surface
14 cavity
$L_{col}$ length
$D_{col}$ diameter

CITATION LIST

Patent Literature

EP 1165241 B1

The invention claimed is:

1. A device for separating materials from a gas flow, the device comprising:
- an inlet for incoming air to be purified,
- a collection chamber,
- an outlet for the purified air,
- a voltage source, and
- a fastening column to which ion yield tips have been coupled, wherein the ion yield tips are arranged directly on a surface of the fastening column, and wherein the ion yield tips protrude from the surface of the fastening column into a cavity of the collection chamber,
- wherein the device is configured to direct high tension to the ion yield tips providing ion beams from the ion yield tips to a collection surface,
- wherein the collection surface conducting electricity is electrically insulated from the outer wall of the collection chamber by an electrical insulation,
- wherein the device is configured to direct voltage of opposite sign to the ion yield tips than the voltage directed to the collection surface, and
- wherein a diameter of the fastening column is in a range between 40-150 mm, a diameter of the collection chamber is in a range between 200-1600 mm, the voltage is in a range between 10-100 kV, and a current is in a range between 50-5000 μA.

2. The device according to claim 1, wherein a diameter ($D_{col}$) of the fastening column is in a range between 80-120 mm, for example 100 mm.

3. The device according to claim 1, wherein a voltage is in a range between 10-60 kV.

4. The device according to claim 1, wherein a current is in a range between 400-2300 μA, preferably 1500 μA.

5. The device according to claim 1, wherein the length of an ion yield tip is in a range between 1-40 mm, preferably between 5-20 mm.

6. The device according to claim 1, wherein a volumetric flow rate of the air is in a range of 20-800 $m^3/h$, preferably 200 $m^3/h$.

7. The device according to claim 1, wherein a velocity of an air flow through the cavity is in a range between 0.5-2.5 m/s, preferably more than 1.0 m/s.

8. The device according to claim 1, wherein the ion yield tips are arranged spirally wound around the surface of the fastening column.

9. The device according to claim 1, wherein a plurality of ion yield tips of a set of ion yield tips is arranged at an even distance to each other.

10. The device according to claim 1, wherein at least a portion of the ion yield tips is orientated at an angle in the range between 40°-50°, preferably of 45°, to the surface of the fastening column in a direction downstream, at an angle in the range between 40°-50°, preferably of 45°, to the surface of the fastening column in a direction upstream, or at an angle in the range between 80°-100°, preferably perpendicular, to the surface of the fastening column.

11. The device according to claim 1, wherein the device is configured to guide an air flow through the cavity between the fastening column and the collection surface.

12. The device according to claim 1, wherein at least a part of an outer wall of the collection chamber or at least a part of a band made of electrically conductive material, which band surrounds the outer wall of the collection chamber, is grounded.

13. A method of separating materials in the form of particles and/or drops from a gas flow, the method comprising:
- directing the gas flow through a collection chamber,
- providing a cavity for the gas flow between a fastening column and a collection surface conducting electricity that is electrically insulated from the outer wall of the collection chamber,
- providing ion yield tips on a surface of the fastening column, wherein said ion yield tips protrude from the surface of the fastening column into the cavity of the collection chamber, wherein a diameter of the fastening column is in a range between 40-150 mm and a diameter of the collection chamber is in a range between 200-1600 mm, creating high tension between the ion yield tips and the collection surface, directing high tension with the opposite sign of direct voltage than the high tension directed to the ion yield tips to the collection surface, wherein the voltage is in a range between 10-100 kV and a current is in a range between 50-5000 μA, and separating inside the collection chamber at least a part of the materials from the gas flow.

14. The method according to claim 13, wherein the gas flow is exposed to an electric field in the cavity between the ion yield tips and the collection surface, and wherein all of the material contained in the gas flows through the cavity.

15. The method according to claim 13, wherein a voltage in a range between 10-60 kV is used.

16. The method according to claim 13, wherein a current in a range between 400-2300 μA, preferably 1500 μA, is used.

17. The method according to claim 13, wherein the gas flow is guided through the cavity with a volumetric flow rate of the air is in a range of 20-800 $m^3$/h, preferably 200 $m^3$/h.

18. The method according to claim 13, wherein the gas flow is guided through the cavity with a velocity in a range between 0.5-2.5 m/s, preferablymore than 1.0 m/s.

19. A device for separating materials from a gas flow, the device comprising:

an inlet for incoming air to be purified, an elliptical collection chamber, an outlet for the purified air, a voltage source, and an elliptical fastening column to which ion yield tips have been coupled, wherein the ion yield tips are arranged directly on a surface of the fastening column, and wherein the ion yield tips protrude from the surface of the fastening column into a cavity of the elliptical collection chamber, wherein the device is configured to direct high tension to the ion yield tips providing ion beams from the ion yield tips to the collection surface, wherein the collection surface conducting electricity is electrically insulated from the outer wall of the elliptical collection chamber by an electrical insulation, wherein the device is configured to direct voltage of opposite sign to the ion yield tips than the voltage directed to the collection surface, and wherein a major axis of the elliptical fastening column is in a range between 40-150 mm, a major axis of the elliptical collection chamber is in a range between 200-1600 mm, the voltage is in a range between 10-100 kV, and a current is in a range between 50-5000 μA.

20. The device according to claim 19, wherein a minor axis of the elliptical fastening column is in a range between 20-120 mm.

* * * * *